(12) United States Patent
Liu

(10) Patent No.: US 7,547,397 B1
(45) Date of Patent: Jun. 16, 2009

(54) PARTICLE-ACCELERATING DEPOSITION AND SEPARATION APPARATUS AND METHOD FOR TURBID WATER

(76) Inventor: Shi-Ping Liu, 5F, No. 11, Alley 20, Lane 309, Fu-Ho Rd., Yung Ho, Taipei County (TW)

( * ) Notice: Subject to any disclaimer, the term of this patent is extended or adjusted under 35 U.S.C. 154(b) by 59 days.

(21) Appl. No.: 11/955,957

(22) Filed: Dec. 13, 2007

(51) Int. Cl.
*B01D 43/00* (2006.01)
*B01D 21/00* (2006.01)

(52) U.S. Cl. ............... 210/801; 210/803; 210/307; 210/519; 210/533; 210/540

(58) Field of Classification Search ......... 210/767, 210/801, 803, 307, 311, 312, 313, 519, 532.1, 210/533, 534, 535, 537, 538, 540, 542
See application file for complete search history.

(56) References Cited

U.S. PATENT DOCUMENTS

| | | | | |
|---|---|---|---|---|
| 973,357 | A * | 10/1910 | Lewis | 210/519 |
| 1,065,542 | A * | 6/1913 | Main | 210/519 |
| 1,104,051 | A * | 7/1914 | Kropp | 210/519 |
| 2,205,934 | A * | 6/1940 | Smith | 210/535 |
| 2,860,786 | A * | 11/1958 | Kittredge | 210/534 |
| 3,375,930 | A * | 4/1968 | Applebaum | 210/519 |
| 4,867,877 | A * | 9/1989 | Hansen et al. | 210/533 |
| 5,453,197 | A * | 9/1995 | Strefling | 210/519 |
| 5,549,827 | A * | 8/1996 | Batson | 210/519 |
| 6,568,541 | B2 * | 5/2003 | Koreis et al. | 210/519 |
| 6,860,991 | B1 * | 3/2005 | Hagon | 210/533 |
| 2005/0173348 | A1 * | 8/2005 | Drake | 210/801 |

FOREIGN PATENT DOCUMENTS

| | | |
|---|---|---|
| CN | 2006100874491 | 12/2008 |
| JP | 59199006 A | 11/1984 |

OTHER PUBLICATIONS

English translation of the abstract for JP59-199006A, Nov. 12, 1984.
English Relevancy Statement for Chinese Office Action 2006100874491, Dec. 19, 2008.

* cited by examiner

*Primary Examiner*—Christopher Upton
(74) *Attorney, Agent, or Firm*—WPAT, P.C.; Anthony King

(57) ABSTRACT

A pretreatment particle-accelerating deposition and separation apparatus and method for purifying turbid raw water, which based on the theories of laminar flow requirement, particle-accelerating vertical deposition and water horizontal movement, separates water molecules from turbidity particles in a laminar flow region (with a Reynolds number lower than 1,000). By accelerating the velocity of high-turbidity raw water and the turbidity particles, the particles settle vertically because of inertia. Thus, the turbidity particles can be removed physically from the raw water and clean water can be collected at different heights of the apparatus while concentrated turbid water can be released to a nearby body of water after appropriate treatments. Thereby, turbid water can be purified for the subsequent coagulation, sedimentation and filtration processes in traditional water treatment plants.

20 Claims, 3 Drawing Sheets

PARTICLE-ACCELERATING DEPOSITION AND SEPARATION APPARATUS AND METHOD FOR TURBID WATER

FIELD OF THE INVENTION

This invention relates generally to a particle-accelerating deposition and separation apparatus and method, in particular to a deposition and separation apparatus and method that physically separate particles from clean water in turbid raw water.

BACKGROUND OF THE INVENTION

Water supply is an important indication of modernization of a society. It not only influences general public health, industrial developments and commercial prosperity but also affects people's daily life. Therefore, supplying high-quality, safe and sufficient drinking water is one of a government's most important tasks. Conventional water treatments depend on good-quality raw water and stable purifying facilities to provide hundreds of thousands tons of drinking water that meets the drinking water standards. However, heavy rainfall after natural disasters such as earthquake and hurricane and human activities such as over-development on hillsides and poor soil-and-water conservation may result in surface runoff containing tremendous amount of suspended particles in streams and subsequently lakes and dams. The extra particle impurity causes high turbidity in raw water sources, which hinders the purifying functions in water treatment facilities and often temporarily disables water supply system in severe conditions.

Turbidity in surface water is usually caused by sands, clay, silt, soil particles and other colloidal impurity. Surface water movement after heavy rainfall washes soil particles from hillsides and disturbs sediments in the waterways results in a significant increase in the level of turbidity. Removal of water turbidity is somehow difficult because the fine particles are most likely too tiny to settle effectively in the water treatment processes. The rapid sand filtration system includes: coagulation, flocculation, gravity deposition, rapid sand filtration, disinfection by adding chlorine, etc. The efficiency of the rapid sand filtration system is dependent upon inflow water turbidity. When water turbidity exceeds 2,000 nephelometric turbidity units (NTU), most water treatment facilities may experience clog malfunction in rapid sand filtration process. If a rapid sand filtration pool is frequently clogged, back-wash is frequently required to restore its filtration function. However, high frequency of back-wash significantly decreases the water quality.

In a rapid sand filtration system, coagulants react with suspended particles to form flocs. The flocs then settle in sedimentation basin so as to avoid clogging the sand-filtering pool. However, chemical coagulation produces large amounts of sludge and reduces the density of the flocs, which hinders the deposition thereof. After rainfall, the turbidity of raw water may reach tens of thousands NTU. Traditional water purifying process is unable to process such high-turbidity raw water by coagulation or gravity deposition. The malfunction of water treatment plants caused by high turbid raw water will greatly affect water quality and may temporarily disrupt the water supply if the turbidity is extremely high. Water supply is a civil necessity. Lack of water supply is detrimental to people's health and local economy. Therefore, it is desirable to provide a suitable water clarifying method to resolve the problem of high turbidity in water after heavy rainfall, especially in the event of hurricanes.

The main characteristic of highly turbid raw water is excessive amount of suspended particles. The level and nature of the turbidity depends upon the types and sizes of particles over which the water has run and the velocity of the water. In flowing water, suspended particles mix well with water and do not settle easily. When the water becomes still, larger and heavier suspended particles sink quickly, while the smaller and lighter ones remain suspended. Deposition of such fine particle can be achieved only when the water is absolutely still and it may take weeks or even months for the water to become clear. It is well known that the need for water supply in a modern society increases every year due to population and economy growth. Highly turbid water requires large tracts of land for the installation of extra sedimentation and filtration facilities, which are difficult to acquire especially in metropolitan areas. Further, the efficiency of the rapid sand filtration system in producing good quality and sufficient quantity of drinking water cannot be achieved without appropriate water turbidity pre-treatment process.

Alternatively, centrifugal methods were once applied to remove extra water turbidity. However, the centrifugal method consumes huge amount of electricity and requires large spaces while its turbidity removal efficiency is very low. Currently, most water treatment plants add large amount of chemical coagulants to raw water to accelerate the floc formation and effectively remove water turbidity. Larger flocs associated with tiny particles in water tend to settle faster in the sedimentation tank to clarify the water. However, chemical coagulating agents produce large amount of sludge, which in turn becomes another pollution problem.

Accordingly, an apparatus and/or method that removes water turbidity by physically accelerating the deposition of particles in water, relieves the impact of high-turbidity water and overcomes the defects of conventional water treatment problems, such as consumption of large amount of electricity, low deposition efficiency, sludge formation created by chemical coagulants, is always welcome.

SUMMARY OF THE INVENTION

The object of the subject invention is to provide a particle-accelerating deposition and separation apparatus and method for treating highly turbid water without using any chemical coagulants. Another advantage of the subject invention is that the physical particle separation mechanism is not restricted by any upper limit of water turbidity. The particle-water separation process in the subject invention allows continuous clean water supply with minimum maintenance. The subject invention in one embodiment relates to a particle-accelerating deposition and separation apparatus. The apparatus mainly contains: a housing, a hollow conical flow accelerator, and a particle condenser. The housing contains a hollow cylinder provided with a plurality of clean water collecting pipes disposed on a peripheral wall thereof at various heights and equipped with at least one silt-removing outlet on a bottom thereof, a top plate containing an opening therein and disposed on a top inner side of the hollow cylinder, and a bottom plate containing an opening therein and disposed at a bottom end of the hollow cylinder. The hollow conical flow accelerator is disposed in the housing, and contains a water inlet with a first diameter, a water outlet with a second diameter smaller than the first diameter, and a diameter-reducing portion between the water inlet and the water outlet. The water inlet is connected to the opening of the top plate of the housing. The particle condenser is disposed in the opening of the bottom plate of the housing and under the water outlet of the hollow conical flow accelerator. The particle condenser contains a receiving entrance connected with the opening of the bottom plate of the housing.

The subject invention in another embodiment relates to a particle-accelerating deposition and separation method for turbid water containing the following steps: (a) providing a housing containing: a hollow cylinder provided with a plurality of clean water collecting pipes disposed on a peripheral wall thereof at various heights and equipped with at least one silt-removing outlet on a bottom thereof, a top plate containing an opening therein and disposed on a top inner side of the hollow cylinder, and a bottom plate containing an opening therein and disposed at a bottom end of the hollow cylinder; (b) providing a hollow conical flow accelerator disposed in the housing and containing a water inlet with a first diameter, a water outlet with a second diameter smaller than the first diameter, and a diameter-reducing portion between the water inlet and the water outlet, said water inlet being connected to the opening of the top plate of the housing; (c) providing a particle condenser disposed in the opening of the bottom plate of the housing and under the water outlet of the hollow conical flow accelerator, said particle condenser containing a receiving entrance connected with the opening of the bottom plate of the housing; (d) defining an area between the water outlet of the hollow conical flow accelerator and the receiving entrance of the particle condenser as a particle-water separation area; (e) guiding turbid water into the water inlet of the hollow conical flow accelerator; (f) collecting silt from the silt-removing outlet of the hollow cylinder accumulated on a bottom edge of the housing; (g) receiving particles through the receiving entrance of the particle condenser wherein the particles are accelerated and expelled from the water outlet of the hollow conical flow accelerator and subsequently depart from the particle-water separation area; and (h) collecting clean water from the plurality of clean water collecting pipes of the hollow cylinder wherein the clean water departs from the particle-water separation area.

The feature of the subject invention is to accelerate a water flow physically and the suspended particles contained therein via a hollow conical flow accelerator by gravity under the undisturbed laminar flow condition. The particles contained therein are accelerated and vertically descend because of inertia while the water molecule clusters with higher mobility slowly move laterally and horizontally. Thereby, the particles and clean water are physically separated and the raw water is purified. The apparatus and method of the subject invention may be used as a pretreatment for purifying turbid raw water so that a conventional water treatment facility can subsequently and appropriately further purify the pre-treated water.

The parameters related to the subject invention include: (1) limitation to the Reynolds Number of laminar flow to control the flow under undisturbed streamline flow condition; (2) mobility and diffusion coefficient of particles and water molecule clusters to control the separation conditions of the vertically descending particles and horizontally flowing clean water; and (3) gravitational terminal settling velocity to control the vertical particle deposits of various diameters. The parameters are specifically stated as follows:

Limitation to the Reynolds Number of laminar flow: there are two kinds of forces that may apply to an object in a flow. One is the inertia force created by accelerating or decelerating the object, and the other is the viscous force created by the viscosity of the flow medium. The ratio between the inertia force and the viscous force is called the Reynolds Number (Re):

$$Re = \text{inertia force/viscous force} = \rho v d/\mu \quad \text{(Formula 1)}$$

In the above formula, $\rho$ represents fluid density, v represents flow velocity, d represents diameter of an object or a flow pipe, and $\mu$ represents viscosity of flow at different temperatures. When a flow flows around an object where the viscous force is stronger, the flow condition is called laminar flow or streamline flow. In the laminar flow, the flow status within a substantial distance between upstream and downstream of the object is in streamlines. Since the flow is under the control of the viscous force, the flow is not disturbed. When the inertia force of the object in the flow gradually increases and becomes larger than the viscous force, the streamline status is replaced by turbulent flow status. In the turbulent flow, the speed of the fluid at any point undergoes continuous changes in both magnitude and direction. In the process of transformation from a laminar flow to a turbulent flow, the Reynolds Number increases during what is called the intermediate zone. In the intermediate zone, factors such as objective geometry, fluid temperature and viscosity may trigger the change from/to laminar flow and turbulent flow. The Reynolds Number ranges of laminar flow, intermediate zone, and turbulent flow are listed in the following Table 1.

TABLE 1

| Reynolds Number (Re) range | Flow status |
| --- | --- |
| 0 < Re < 1,000 | laminar flow |
| 1,000 < Re < 10,000 | intermediate zone |
| 10,000 < Re | turbulent flow |

Please note that the functions of the subject invention can be executed only under the undisturbed laminar flow condition. That is, the process that separates particles from clean water must be carried out in a laminar flow. Therefore, the Reynolds Number of the subject invention should be kept under 1,000 to avoid the occurrence of turbulent flow and also to prevent the deposited particles from being disturbed again. Mobility and diffusion coefficient of particle: particles are separated from clean water in the subject invention mainly because the mobility of particles and that of clean water are significantly different. In a laminar flow, mobility is defined as follows:

$$M = \frac{C_c}{3 \times \pi \times \mu \times d} \quad \text{(Formula 2)}$$

In the above formula, M represents mobility of particle, $C_c$ represents the Cunningham coefficient, which describes the transport phenomena of micro-particles between water molecules, $\mu$ represents viscosity of flow, and d represents diameter of a particle. According to the above formula, the larger the particle, the lower the mobility. That is, large particles in a laminar flow are difficult to shift to another direction. In a laminar flow, particles tend to move along the streamlines due to their inertia. Diffusion coefficient is another important parameter that describes molecule or particle movement in a flow medium. It reflects the phenomenon that molecule or particle diffuses from a high concentration area toward a low concentration zone. The smaller the particle, the more easily the particle moves in a flow medium. That is, smaller molecules or particles have higher diffusion coefficients and are comparatively easy to move in a flow medium. The diffusion coefficient is defined as follows:

$$D = MkT \quad \text{(Formula 3)}$$

In the above formula, D represents diffusion coefficient, k represents the Boltzmann constant, and T represents absolute temperature. Please refer to the following Table 2, which lists the mobility and diffusion coefficients of particles with different diameters. The higher the mobility, the higher the velocity created by a unit force on the particle.

Even though the size of a single water molecule is about 2 Å (1 Å=$10^{-10}$ m), water molecules cannot move in the form of a single water molecule due to its polarity and hydrogen bonds. The water molecules often move in the form of water molecule clusters. The approximate size of a water molecule cluster depends on the flow velocity, water temperature, viscosity, dissolvent materials, and ion strength in the flow. Suppose that a water molecule cluster is in a spherical shape, and its diameter is around 0.02 μm. Because the specific gravity of the water molecular cluster is 1, the diffusion coefficient thereof at the temperature of 20° C. is $2.6 \times 10^{-6}$ cm$^2$/sec, which is around 1,000 times that of a solid particle with a diameter of 1 μm. Accordingly, we can utilize the significant differences between the diffusion coefficients of a water molecule cluster and particles with various sizes to physically separate particles from clean water by making the particles settle vertically and water molecule clusters move horizontally.

TABLE 2

| Diameter (μm) | Mobility, M (cm/sec/dyne) | Diffusion coefficient at 20° C., D (cm$^2$/sec) |
|---|---|---|
| Water molecule cluster, 0.02 | $6.5 \times 10^7$ | $2.6 \times 10^{-6}$ |
| 0.1 | $3.2 \times 10^6$ | $1.3 \times 10^{-7}$ |
| 0.6 | $2.3 \times 10^5$ | $9.2 \times 10^{-9}$ |
| 1 | $1.2 \times 10^5$ | $5.0 \times 10^{-9}$ |
| 6 | 18,200 | $7.3 \times 10^{-10}$ |
| 10 | 10,800 | $4.4 \times 10^{-10}$ |
| 20 | 5,340 | $2.2 \times 10^{-10}$ |
| 60 | 1,770 | $7.1 \times 10^{-11}$ |
| 100 | 1,060 | $4.3 \times 10^{-11}$ |
| 200 | 529 | $2.1 \times 10^{-11}$ |

Gravitational terminal settling velocity: Analytical results show that the diameter of particle in raw turbid water ranges from several μm to 200 μm ($10^{-6}$ m). In a laminar flow, particles are influenced of by gravity, reach a balance with flow resistance and come to a terminal settling velocity ($V_T$.) Large particles have a higher $V_T$ than small particles and thus can settle in a short period of time. However, the $V_T$ of small particles is so low that if no physical or chemical methods are applied in water treatment plants, small particles are unable to settle shortly.

Table 3 below shows the terminal settling velocity and the time needed for particles with various diameters to descend 1 meter at the temperature of 20° C. The $V_T$ of particles with a diameter of 100 μm is 100 times that of particles with a diameter of 10 μm. It takes around 3.4 hours for a 10 μm particle to descend 1 meter while it only takes around 2.1 minutes for a 100 μm particle to travel the same distance. Accordingly, the smaller the particle, the longer the time needed for the particles to settle in a pure gravity deposition system.

In the subject invention, the flow is controlled under the laminar flow condition and the particles in the flow settle along the streamlines thereof so that the particles do not tend to collide and interfere with each other. With the flow accelerating design and the particle terminal settling velocity created by gravity force, particles descend downward just like free falling balls released in a descending elevator. With the high diffusivity of water molecule clusters, clean water composed of the water molecule clusters moves horizontally and gets around the vertically descending particles, so the descending particles will not be disturbed. Thereby, the subject invention physically separates turbidity particles from water molecule clusters without adding any chemical agents.

TABLE 3

| Diameter of particles (μm) | Terminal settling velocity ($V_T$, cm/sec) | Time needed for particles to descend 1 m at the temperature of 20° C. |
|---|---|---|
| 0.1 | $2.5 \times 10^{-6}$ | 472 days |
| 0.6 | $3.8 \times 10^{-5}$ | 31 days |
| 1 | $9.6 \times 10^{-5}$ | 12 days |
| 6 | $3.0 \times 10^{-3}$ | 9.3 hours |
| 10 | $8.2 \times 10^{-3}$ | 3.4 hours |
| 20 | 0.033 | 51 minutes |
| 60 | 0.294 | 5.7 minutes |
| 100 | 0.815 | 2.1 minutes |
| 200 | 3.26 | 30 seconds |

Please refer to FIG. 1, which is a schematic view of a vertically descending particle P and horizontally moving water molecule clusters (shown as the streamlines). The separation of the particle P and clean water can be described in terms of the relative movement therebetween. When the water molecule clusters move in the horizontal direction D2, they intersect the particle P. A stagnant layer T formed on the particle P prevents the water molecule clusters from directly colliding with the particle P so the water molecule clusters pass around the particle P. Therefore, the accelerating particle P that moves in the vertical direction D1 in accordance with the gravity will not be easily influenced by the horizontally moving water molecule clusters, and will thus depart from the particle-water separation area. Namely, when the water molecule clusters move in the horizontal direction D2, the streamlines will glide along the surface of the stagnant layer T formed on the particle P, and will not disturb the vertically descending particle P.

In view of the above, the subject invention utilizes (1) limitations to the Reynolds Number to control the flow under the undisturbed laminar flow condition, (2) mobility and diffusion coefficients of particles and water molecule clusters to control the separation of the vertically descending particles and the horizontally flowing clean water, and (3) gravitational terminal settling velocity of the particles to determine the terminal settling velocity of the particles with different diameters.

BRIEF DESCRIPTION OF THE DRAWINGS

The above objects and advantages of the present invention will become more apparent from the ensuing description of preferred embodiments thereof with reference to the attached drawings, in which.

DETAILED DESCRIPTION OF THE PREFERRED EMBODIMENTS

Figure 1:
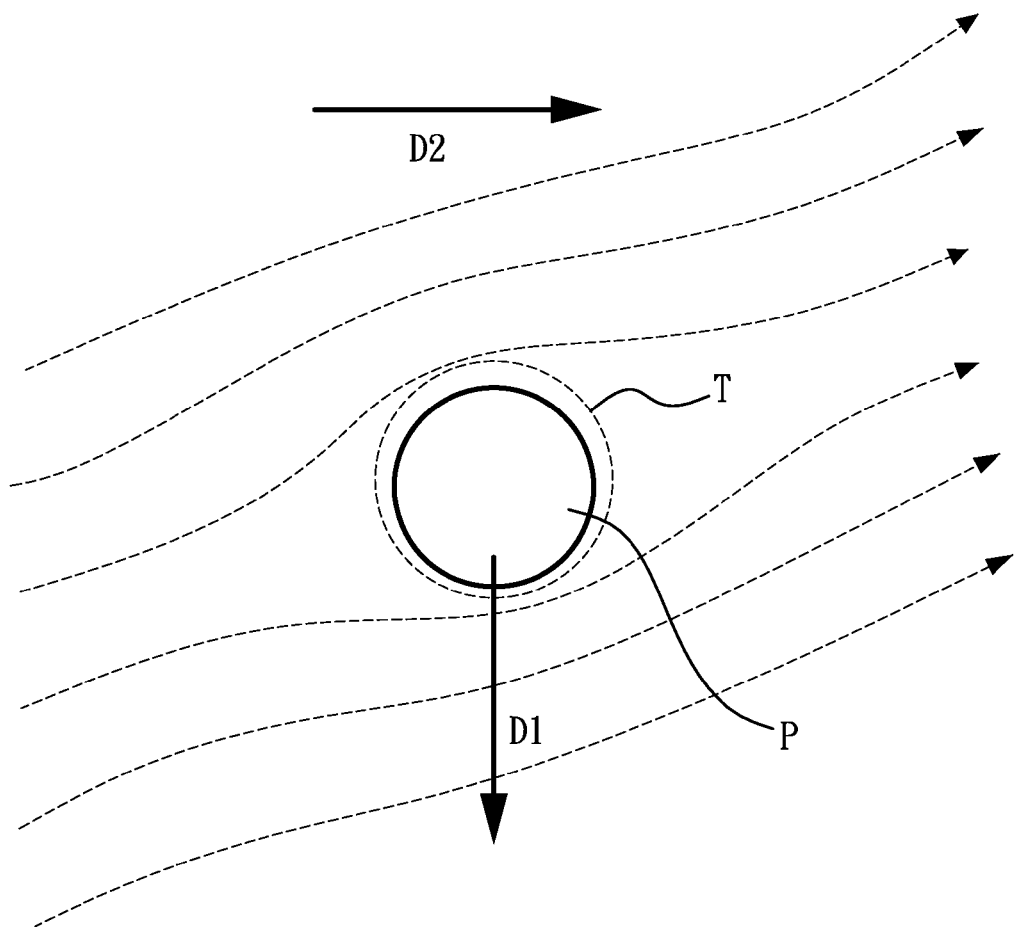
FIG. 1 is a schematic view of a vertically descending particle (P) and horizontally moving water molecule clusters.
Figure 2:
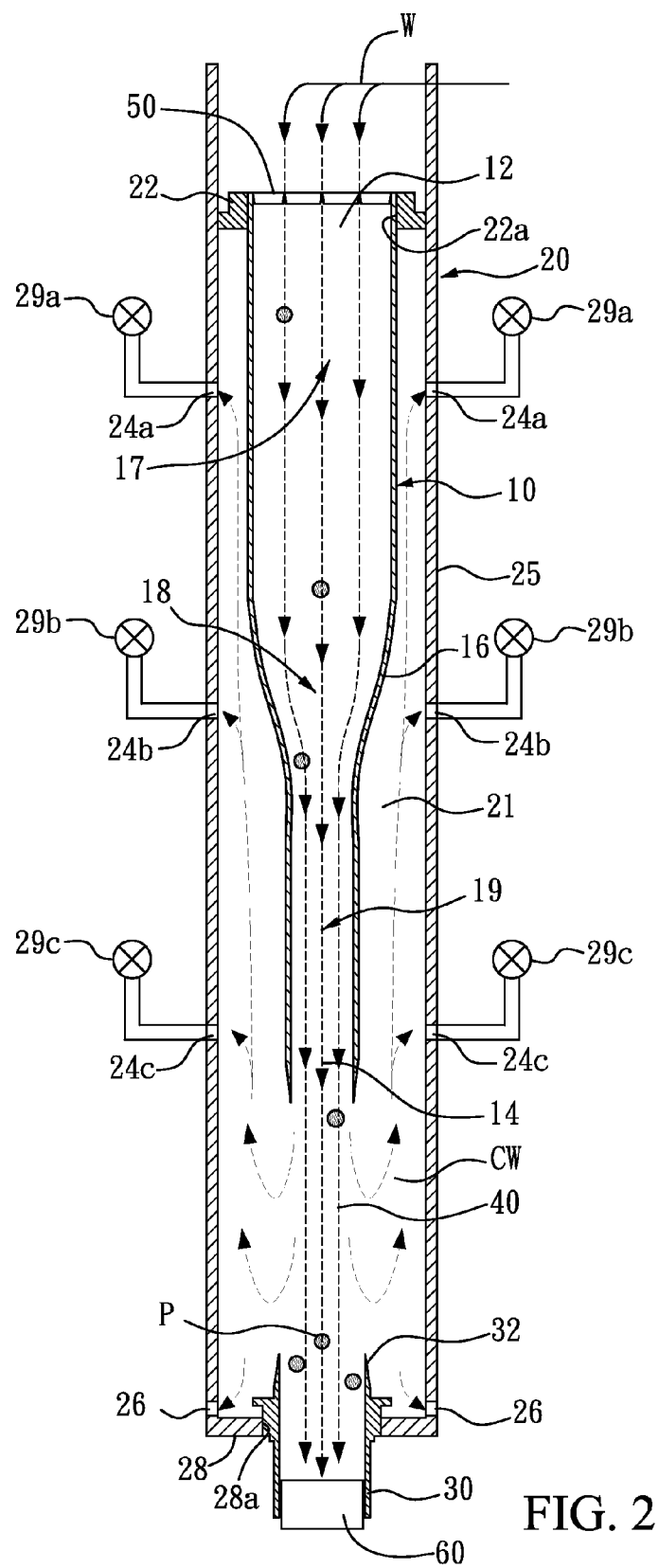
FIG. 2 is a cross-sectional view of a preferred embodiment of the subject invention.
Figure 3:
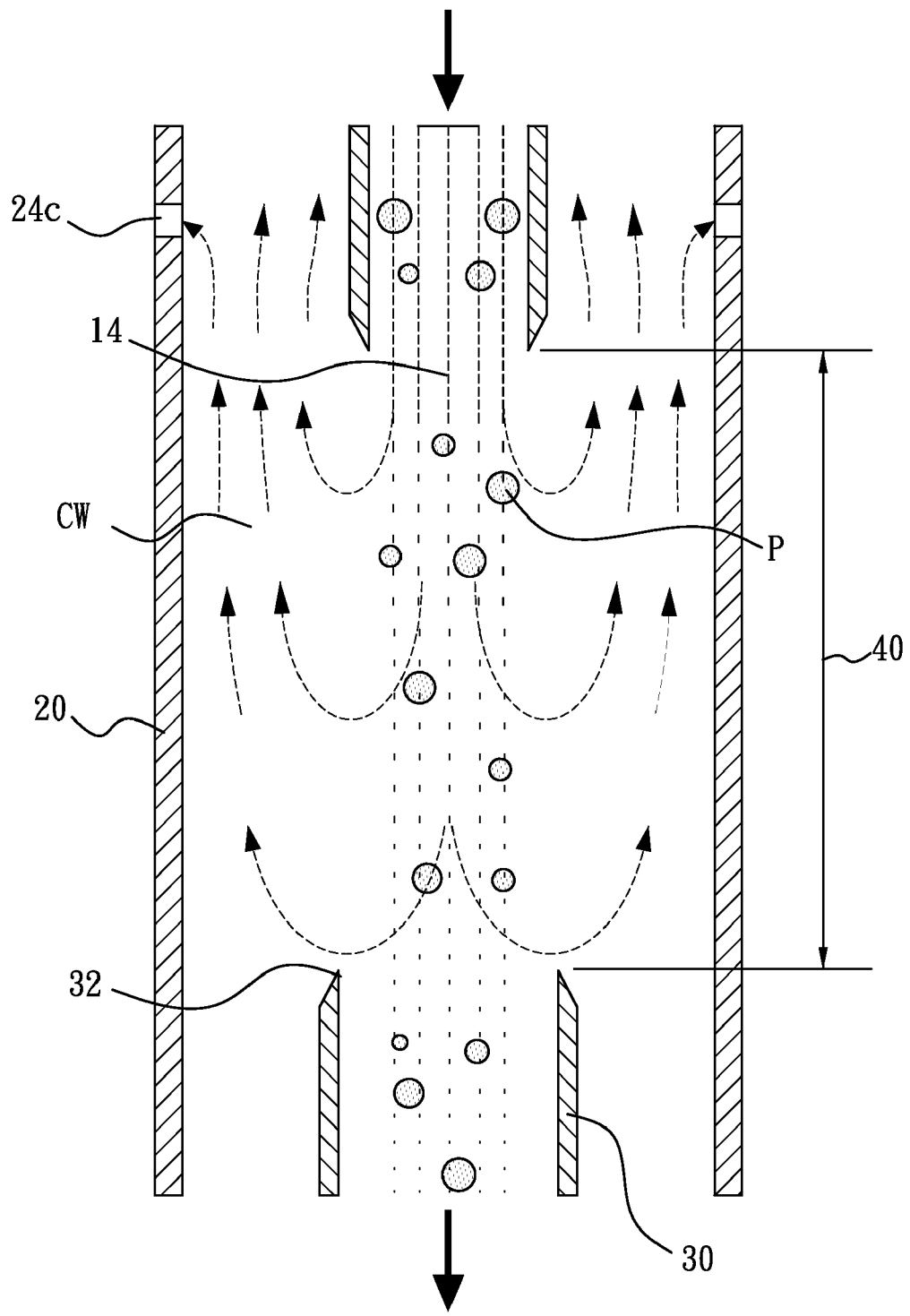
FIG. 3 is a regionally enlarged view of the preferred embodiment of the present invention.

In FIGS. 2-3, the embodiment of the present invention relates to a particle-accelerating deposition and separation apparatus and method in an undisturbed laminar flow. The apparatus mainly contains: a housing 20, a hollow conical flow accelerator 10, a particle condenser 30, and a screen (i.e. a No. 200 screen 50). The housing 20 contains a hollow cylinder 25 provided with three clean water collecting pipes, namely the high, middle and low clean water collecting pipes 24a, 24b, 24c disposed on a peripheral wall thereof at various heights and equipped with at least one silt-removing outlet 26 on a bottom thereof. The hollow cylinder 25 has an inner diameter of approximately 15 centimeters and a height of approximately 105 centimeters, and can sustain the water pressure at a depth of 1.5 meters. The hollow cylinder 25 is 1 cm thick, made of acrylic, stainless steel, PVC or other materials with a smooth internal surface, and suitable for long-term continuous use with high-turbidity water. The clean water collecting pipes 24a, 24b, 24c each contains a flow adjuster, respectively 29a, 29b, 29c.

The housing 20 includes a top plate 22 containing an opening 22a therein and disposed on a top inner side of the hollow cylinder 25, and a bottom plate 28 containing an opening 28a therein and disposed at a bottom end of the hollow cylinder 25.

The hollow conical flow accelerator 10 is disposed in the housing 20, and preferably is made of a 70 cm-tall hollow plastic cone. The hollow conical flow accelerator 10 contains a water inlet 12 with a first diameter, a water outlet 14 with a second diameter smaller than the first diameter, and a diameter-reducing portion 16 between the water inlet 12 and the water outlet 14. The water inlet 12 of the hollow conical flow accelerator 10 has a diameter of approximately 10 centimeters, and the water outlet 14 of the hollow conical flow accelerator 10 has a diameter of approximately 5 centimeters. A tangential angle of the water outlet 14 of the hollow conical flow accelerator 10 is designed to be less than 20 degrees to reduce the turbulent flow phenomenon. The water inlet 12 is connected to the opening 22a of the top plate 22 of the housing 20. In addition, water inlet 12 is threadly connected with the opening 22a of the top plate 22 and a sealing rubber is applied to separate turbid raw water from processed clean water. The main function of the hollow conical flow accelerator 10 is to accelerate the flow. With the accelerated velocity, the inertia settling velocity of the particle in the turbid water is increased.

The particle condenser 30 is disposed in the opening 28a of the bottom plate 28 of the housing 20 and under the water outlet 14 of the hollow conical flow accelerator 10. The particle condenser 30 contains a receiving entrance 32 connected with the opening 28a of the bottom plate 28 of the housing 20, and a flow-control valve 60 for controlling the volume of the turbid water emitted from the particle condenser 30. The receiving entrance 32 of the particle condenser 30 has a diameter larger than that of the water outlet 14 of the hollow conical flow accelerator 10 and a tangential angle of less than 20 degrees. The receiving entrance 32 of the particle condenser 30 receives vertically descending particles and a small amount of carrying flow, and condenses them into high-turbidity water. In the condensing process, no chemical material is added and the condensed high-turbidity water can be emitted from the water processing plant after simple treatments.

An area between the water outlet 14 of the hollow conical flow accelerator 10 and the receiving entrance 32 of the particle condenser 30 is defined as a particle-water separation area 40, which is approximately 20 cm long (and should not be more than 30 cm.) The No. 200 screen 50 is disposed on top of the water inlet 12 of the hollow conical flow accelerator 10 so as to regulate the turbid water to avoid disturbing the laminar flow.

Please refer to FIGS. 2 and 3. The particle-accelerating deposition and separation method of the subject invention contains: guiding turbid water W into the water inlet 12 of the hollow conical flow accelerator 10, and accelerating turbid water W to pass through the particle-water separation area 40 via the hollow conical flow accelerator 10. The hollow conical flow accelerator 10 is capable of accelerating the turbid water because of the variations in the diameter of its cross-section. When the turbid water is accelerated, the particles P contained therein are also accelerated. (The purpose of accelerating the particles P in the turbid water is to ensure that the particles P can pass through the particle-water separation area 40 as soon as possible to reduce the chance of them laterally escaping from the particle-water separation area 40.) The accelerated particles P create a downward inertia so that clean water CW laterally flows out of the particle-water separation area 40 and particles P descend to the particle condenser 30. In addition, the method also includes the step of collecting silt from the silt-removing outlet 26 of the hollow cylinder 25 accumulated on a bottom edge of the housing 20.

Afterwards, particles P are received through the receiving entrance 32 of the particle condenser 30. The particles P are accelerated and expelled from the water outlet 14 of the hollow conical flow accelerator 10 and subsequently depart from the particle-water separation area 40. Meanwhile, clean water CW is collected from the three clean water collecting pipes 24a, 24b, 24c of the hollow cylinder 25. The clean water CW is separated from the particles P and slowly and laterally flows out of the particle-water separation area 40.

In the hollow conical flow accelerator 10 and between the water inlet 12 and the diameter-reducing portion 16 is a steady-flow area 17, in which a steady laminar flow is formed and the suspended particles P can descend steadily and downward. In the diameter-reducing portion 16 of the hollow conical flow accelerator 10 is an accelerating steady flow area 18, in which the turbid water as well as the particles P contained therein are accelerated. The particles P create a vertically downward inertia. In the hollow conical flow accelerator 10 and between the diameter-reducing portion 16 and the water outlet 14 is an accelerating steady-flow area 19, wherein the flow remains laminar (with the Reynolds Number lower than 1,000). The streamlines from the steady-flow area 17 of 10-cm diameter gradually converge in the accelerating steady-flow area 19 of 5-cm diameter. In other words, throughout the method of the subject invention, the flow has to remain a laminar flow. From the particle-water separation area 40, the particles P in a laminar flow are accelerated to descend in the vertical direction into the particle condenser 30. The particles P are then condensed and emitted. The clean water CW laterally moves out of the particle-water separation area 40 and then moves upward to the clean water collecting pipes 24a, 24b, 24c at different heights according to its diffusibility. The length of the particle-water separation area 40 should be designed on the basis of the ranges of and diameter ranges of the particles P, and the nature of the flow.

As stated above, clean water CW moves slowly and laterally and does not disturb the flow condition of the particle-water separation area 40 (no turbulent flow.)

The clean water CW flows laterally out of the particle-water separation area 40, and the particles P descend into the particle condenser 30 in accordance with the vertical inertia. Thereby, the vertically moving particles P and the laterally moving clean water CW are physically separated and the water purifying purpose is accomplished. Since the turbid water W that passes through the particle-water separation area 40 needs to be controlled under the laminar flow condition, its Reynolds Number needs to be kept under 1,000. This is done by controlling the flow velocity of the flow in the particle-water separation area 40. First, the design value of the Reynolds Number needs to be decided (for example, Re=500.) Second, the design flow velocity is calculated according to the aforementioned Formula 1. Afterwards, the flow-control valve 60 of particle condenser 30 is used to control the volume of the turbid water emitted from the particle condenser 30 and the flow adjusters 29a, 29b, 29c of the clean water collecting pipes 24a, 24b, 24c are used to control the volume of the clean water collected, thereby controlling the flow velocity in the particle-water separation area 40 to acquire the desired Reynolds Number.

During the process of purifying turbid water, a few small particles P may follow the movements of the clean water CW and escape from the particle-water separation area 40. Under the influence of gravity force, it is difficult for such small particles to move upward. Accordingly, the high water collecting pipe 24a collects the cleanest water, the middle and low water collecting pipes 24b, 24c collect less clean water. Clean water can be collected from different water collecting pipes depending on users' need and the turbidity of the raw water. The flow adjusters 29a, 29b, 29c of the clean water collecting pipes 24a, 24b, 24c control the volume of the collected clean water according to the separation status of the particles P in the particle-water separation area 40. The clean water CW in the process of moving upward creates a clean water upward-moving area 21. The operation of the clean water collecting pipes 24a, 24b, 24c causes the clean water CW to move upward along the outer sides of the hollow conical flow accelerator 10. Although the space outside the hollow conical flow accelerator 10 gradually reduces, the clean water CW is sequentially collected by the low and middle water collecting pipes 24c, 24b and thus the upward flow velocity of the clean water CW remains generally constant. The upward flow velocity of the clean water CW is controlled by the flow adjusters 29a, 29b, 29c of the clean water collecting pipes 24a, 24b, 24c.

In a preferred embodiment of the subject invention, the method of the subject invention further includes the step of adjusting the flow-control valve 60 of the particle condenser 30 to keep the volume of the emitted condensed turbid water at around 25% of the total input of turbid water. In other preferred embodiments, the flow-control valve 60 of the particle condenser 30 and the flow adjuster 29a, 29b, 29c of the clean water collecting pipes 24a, 24b, 24c can be adjusted to 1) control the time for turbid water to pass through the particle-water separation area 40 so that it is within 60 seconds; 2) keep the flow velocity at the water outlet 14 of the hollow conical flow accelerator 10 at approximately 1 cm/s; or 3) keep the clean water colleted from the clean water collecting pipes 24a, 24b, 24c of the hollow cylinder 25 at around 75% of the total inputted turbid water.

In view of the above, the design of the method is based on: (1) Investigations on turbidity of raw water and distributions of particle diameter and particle density; (2) shape of conical flow accelerator and laminar flow control; (3) nature and length of particle-water separation area, and conditions of the particle-water separation; (4) volume of water collected from clean water collecting pipes at various heights; and (5) design of particle condenser and turbid water emission rate. The specifics of the basis are as follows:

Investigations on turbidity of raw water and distribution of particle diameter and particle density: the particles come from washout of silt or soils, and the diameters thereof vary according to locations, time, quantity of rain and force of rain. The distribution of particle diameter and particle density is different at different times, in different season and with different quantities of rain even if the raw water comes from the same source. The terminal settling velocity ($V_T$) can be calculated according to the particle diameter ($d_p$) distribution percentages, particle densities ($\rho_p$), water viscosity ($\mu$). On the basis of the resulting terminal settling velocity, the parameters for removing the particles and the turbidity-removing efficiency can be decided.

Shape of conical flow accelerator, and laminar flow control: the conical flow accelerator is of a symmetrical diameter-reducing shape with a larger upper diameter and a smaller lower diameter. The shape of the conical flow accelerator contributes to the acceleration of the flow. However, the flow therein must remain as a laminar flow (with a Reynolds Number lower than 1,000.) In the conical flow accelerator, the particles move along the streamlines of the laminar flow. The terminal settling velocity caused by gravity enables the particles to descend vertically. The accelerated particles act like an athlete who cannot suddenly stop moving right after running a 100-meter race and must keep moving forward in the same direction for a distance before stopping. Accordingly, the shape of the conical flow accelerator accelerates the flow and the flow remains laminar, so the particles pass through the particle-water separation area at an accelerated velocity, and the particles and the water molecule clusters are thus separated.

Nature and length of particle-water separation area, and conditions of the particle-water separation: under the principle of "mass inertia," the larger the diameter of a particle, the less the movement that can be made in the direction of the applying force, and the lower its mobility. Since the particles have low mobility and the water molecule clusters have high diffusibility, the particles, after leaving the conical flow accelerator, accelerate and descend in the vertical direction and force the water molecule clusters to slowly and laterally flow out of the particle-water separation area. Although the longer the particle-water separation area is, the more clean water can be collected, it is also true that the more particles may laterally flow out of the particle-water separation area. On the other hand, the shorter the particle-water separation area, the higher the flow velocity of the laterally flowing clean water, and the bigger the chance of formation of turbulent flow. In that case, the efficiency of removing particles from turbid water is comparatively low. Therefore, it is the appropriate length of the particle-water separation area that helps to acquire the maximum volume of clean water with the desired particle-removing efficiency. The particles descend to the particle condenser and are afterward collected and emitted from the particle condenser.

Design of the particle condenser and turbid water emission rate: the particle condenser is located right below the particle-water separation area to collect the vertically descending particles. The turbid water emitted from the particle condenser should be around 25% of the total input of turbid water. That is, the clean water laterally flowing out of the particle-water separation area should be 75% of the total input of turbid water. The quality of the collected clean water depends on the particle distribution in the raw water. The density of the turbid water emitted from the particle condenser is highly increased. Since no chemical agents are used in the subject invention, after a simple treatment (to avoid pollution), the condensed turbid water can be emitted to a nearby body of water.

Volume of water collected from clean water collecting pipes at various heights: The clean water collecting pipes at various heights guide the clean water to laterally flow out of the particle-water separation area and move upward. The velocity of the upward flow is designed on the basis of the terminal settling velocity of the main particles. The higher the clean water collecting pipe, the cleaner the collected water. The heights of the clean water collecting pipes and the volume of the collected clean water should be controlled according to the particle distribution in the turbid water.

The feature of the subject invention is to utilize the gravitational depositing inertia of the particles and the high diffusibility of the water molecule clusters in raw water to separate the particles from clean water so that the turbidity can be removed from the raw water. Since the density of the particles is crucial to produce gravitational deposition, the method of the subject invention should not involve any chemical coagulating agents so as to avoid the formation of great amounts of flocs, which will adversely effect gravitational deposition. If chemical coagulating agents are added, great amounts of flocs with low density will be formed, which goes against the principle of design of the subject invention, namely to utilize the physical deposition of the particles to separate the particles from the clean water. The advantages of the subject invention include: (1) processing raw water without an upper limit to the turbidity; (2) using no chemical coagulating materials; (3) requiring minimum electricity and maintenance; and (4) continuous water-cleaning process.

According to the method of the subject invention, high-turbidity raw water is introduced into the hollow conical flow accelerator by gravity. The raw water passes through the No. 200 screen under steady flow velocity and then enters the water inlet with 10-cm diameter of the hollow conical flow accelerator. The conical shape of the conical flow accelerator enables it to accelerate the flow velocity of the turbidity raw water including the particles. The diameter of the water outlet of the conical flow accelerator is 5 cm and the flow condition at the water outlet is laminar flow with a Reynolds Number lower than 1,000.

In a laminar flow, the particles are accelerated to pass through the particle-water separation area with linear velocity During the particle-accelerating deposition period, the water molecule clusters with high diffusibility are guided to laterally move out of the particle-water separation area. Afterward, the clean water flows upward to clean water collecting pipes at different heights so that clean water with different degrees of purity may be collected.

The collected clean water thereafter needs to be processed under the traditional rapid sand filtration system. The vertically descending and condensed turbid water is emitted from the particle condenser.

The required fundamental information for the subject invention includes: turbidity of the introduced raw water (NTU), weight percentage of suspended solid (SS), particle diameter distribution, density, operational water temperature etc. According to the particle-accelerating deposition method of the subject invention, three criteria should be considered: laminar flow limitation, vertical deposition of particles and horizontal separation of water. The specifics of the three criteria are as follows: (i) The flow must meet the requirements for laminar flow (cannot be turbulent flow) so that the particles stay in streamlines, (ii) the particles must settle (driven by gravitational inertia and the accelerated flow), and (iii) the water molecule clusters with high diffusibility must steadily and laterally move out of the particle-water separation area and then be collected by clean water collecting pipes at different heights. On the basis of the particle information of the raw water and the aforementioned three criteria, the shape and dimension of the hollow conical flow accelerator, the length of the particle-water separation area, the size of the particle condenser, the heights of the clean water collecting pipes and the volume controls thereof are designed.

The features of the subject invention include the geometric design of the hollow conical flow accelerator, the length of the particle water separation area, the particle condenser, and the clean water collecting pipes at different heights.

The main features of the subject invention is described as follows:

1. the shape of the flow accelerator is conical so that the speedup ratio can be as high as 25. The higher the speedup ratio, the better the separation effect. However, the higher the speedup ratio, the smaller the volume of the collected water. In an embodiment of the subject invention, the speedup ratio is preferably 4 on the condition that the accelerated flow remains a laminar flow.

2. The flow condition in the hollow conical flow accelerator is controlled by the height of the introduced water, the flow adjusters of the clean water collecting pipes and the flow-control valve of the particle condenser (the flow in the flow accelerator should be laminar and should not be disturbed.)

3. The particle-water separation mechanism is based on the fact that the diffusibility of the water molecule clusters is greater than the inertia settling velocity of the particles in the vertical direction. The particle density and particle diameter distribution are the basis for designing the length of the particle-water separation area and the volume of the collected water from the clean water collecting pipes in order to achieve the best particle-water separation.

4. The particle condenser is a diameter-reducing pipe with a larger receiving entrance on top to receive the vertically depositing particles accompanied by a small amount of carrying water and condense them into high-turbidity water. The receiving entrance of the particle condenser has an inner diameter larger than that of the water outlet of the hollow conical flow accelerator. In an embodiment, the condensed high-turbidity water is controlled by the flow-control valve of the particle condenser, and the water emitted from the particle condenser is about 25% of the total input of turbid water.

5. In other words, the high, the middle and the low clean water collecting pipes as well as the silt-removing outlet collect around 75% of the total input of turbidity water and the water emitted from the particle condenser is about 25% of the total input of turbid water.

The particle investigation and the design of separating high-turbidity raw water should be made in the following stages: Stage 1: investigating the high-turbidity water. That is, analyzing the turbidity of raw water for weight percentage of suspended solid (SS), particle diameter distribution, particle density, water temperature etc., and observing the depositing rate of particles of different diameters to be used as references for the separation design.

Stage 2: designing the shape of the hollow conical flow accelerator. That is, deciding the input volume and flow velocity of the raw water and assessing the Reynolds Number and flow velocity of the laminar flow therein.

Stage 3: designing the particle-water separation area. That is, deciding the length of the particle-water separation area and the relative spatial relationship between the water outlet of the hollow conical flow accelerator and the receiving entrance of the particle condenser.

Stage 4: controlling the output volume of the collected clean water and the condensed high-turbidity water. That is, on the basis of the input of raw water determining the emission rate of the clean water collecting pipes at different heights and the emission rate of the particle condenser.

Stage 5: proceeding with an operation test. That is, preliminarily evaluating the separation of the particles and the clean water on the basis of a unit operation test to evaluate the particle-removing efficiency under different parameters.

Stage 6: proceeding with an large-scale test: since a unit apparatus of the subject invention can only process a limited amount of turbid water, a large-scale test is needed to increase the capacity to process turbid water so as to provide the water plant with the desired water-processing volume. The unit apparatus of the subject invention is about 1 m high. The large-scale test can be made by parallel connection of multiple subject apparatuses which can be placed on top of each other so that the integrated apparatuses of the subject invention can meet the need of a water plant. A preliminary test result shows that the subject invention can process turbid raw water of more than 10,000 NTU, and the larger the particle diameter, the better the particle-removing efficiency. The subject invention can process turbid water with particles as small as 10 μm. In addition, integration of multiple apparatuses of the subject invention can meet the need of a water plant to purify turbid water. No chemical materials need to be used in the subject invention. The purely physical particle-accelerating deposition and the clean water diffusion of the subject invention are sufficient to separate particles from clean water. The apparatus of the subject invention can be placed at different levels according to the landscapes without losing the ability to process a great amount of turbidity. The subject invention can be installed at the water-entering end(s) of existing water plants as an emergency pre-treatment system in the hurricane season when turbidity of raw water is high.

In view of the above, the particle-accelerating deposition and separation apparatus and method of the subject invention solve the problems of the conventional arts such as: consumption of a great amount of electricity, poor deposition rate, and a great amount of slurry created by adding chemical coagulating agent.

The invention may also be implemented in other specific modes without departing from the spirit and the essence of the invention. Thus, the above-mentioned embodiments shall be regarded as explanatory but not restrictive. All changes consistent with the meaning and range of the claims and the equivalents shall fall within the scope claimed by the invention.

I claim:

1. A particle-accelerating deposition and separation apparatus comprising:
    a housing, containing:
        a hollow cylinder, provided with a plurality of clean water collecting pipes disposed on a peripheral wall thereof at various heights and equipped with at least one silt-removing outlet on a bottom thereof;
        a top plate, containing an opening therein and disposed on a top inner side of said hollow cylinder; and
        a bottom plate, containing an opening therein and disposed at a bottom end of said hollow cylinder;
    a hollow conical flow accelerator, disposed in said housing and containing a water inlet with a first diameter, a water outlet with a second diameter smaller than the first diameter, and a diameter-reducing portion between said water inlet and said water outlet, said water inlet being connected to said opening of said top plate of said housing; and
    a particle condenser, disposed in said opening of said bottom plate of said housing and under said water outlet of said hollow conical flow accelerator, said particle condenser containing a receiving entrance connected with said opening of said bottom plate of said housing.

2. The apparatus of claim 1, further comprising a screen disposed on top of said water inlet of said hollow conical flow accelerator.

3. The apparatus of claim 2, wherein said particle condenser comprises a flow-control valve for controlling the volume of turbid water emitted from said particle condenser.

4. The apparatus of claim 2, wherein said hollow cylinder has an inner diameter of approximately 15 centimeters and a height of approximately 105 centimeters, and can sustain the water pressure at a depth of 1.5 meters.

5. The apparatus of claim 4, wherein said water inlet of said hollow conical flow accelerator has a diameter of approximately 10 centimeters, said water outlet of said hollow conical flow accelerator has a diameter of approximately 5 centimeters and a tangential angle of said water outlet of said hollow conical flow accelerator is less than 20 degrees.

6. The apparatus of claim 5, wherein a length between said water outlet of said hollow conical flow accelerator and said receiving entrance of said particle condenser is approximately 20 centimeters.

7. The apparatus of claim 2, wherein said receiving entrance of said particle condenser has a diameter larger than that of said water outlet of said hollow conical flow accelerator and a tangential angle of less than 20 degrees.

8. The apparatus of claim 7, wherein said hollow cylinder of said housing are provided with three clean water collecting pipes, namely a high, a middle and a low clean water collecting pipe, each comprising a flow adjuster.

9. A particle-accelerating deposition and separation method for turbid water under a laminar flow condition comprising the following steps:
    (a) providing a housing comprising: a hollow cylinder provided with a plurality of clean water collecting pipes disposed on a peripheral wall thereof at various heights and equipped with at least one silt-removing outlet on a bottom thereof, a top plate containing an opening therein and disposed on a top inner side of said hollow cylinder, and a bottom plate containing an opening therein and disposed at a bottom end of said hollow cylinder;
    (b) providing a hollow conical flow accelerator disposed in said housing and containing a water inlet with a first diameter, a water outlet with a second diameter smaller than the first diameter, and a diameter-reducing portion between said water inlet and said water outlet, said water inlet being connected to said opening of said top plate of said housing;
    (c) providing a particle condenser disposed in said opening of said bottom plate of said housing and under said water outlet of said hollow conical flow accelerator, said particle condenser containing a receiving entrance connected with said opening of said bottom plate of said housing;
    (d) defining an area between said water outlet of said hollow conical flow accelerator and said receiving entrance of said particle condenser as a particle-water separation area;
    (e) guiding turbid water into said water inlet of said hollow conical flow accelerator;
    (f) collecting silt from said silt-removing outlet of said hollow cylinder accumulated on a bottom edge of said housing;
    (g) receiving particles through said receiving entrance of said particle condenser, said particles being accelerated and expelled from said water outlet of said hollow conical flow accelerator and subsequently departing from said particle-water separation area; and (h) collecting clean water from said plurality of clean water collecting pipes of said hollow cylinder, said clean water being separated from said particles and laterally flowing out of said particle-water separation area.

10. The method of claim 9, further comprising a step of: providing a screen disposed on top of said water inlet of said hollow conical flow accelerator so as to regulate the flow velocity of said guided turbid water to avoid disturbance.

11. The method of claim 10, further comprising a step of: providing a flow-control valve to said particle condenser to control a volume of turbid water emitted from said particle condenser.

12. The method of claim 11, further comprising a step of: providing a flow adjuster to each of said plurality of clean water collecting pipes.

13. The method of claim 12, wherein said hollow cylinder has an inner diameter of approximately 15 centimeters and a height of approximately 105 centimeters, and sustain the water pressure at a depth of 1.5 meters.

14. The method of claim 13, wherein said water inlet of said hollow conical flow accelerator has a diameter of approximately 10 centimeters, said water outlet of said hollow conical flow accelerator has a diameter of approximately 5 centimeters and a tangential angle of said water outlet of said hollow conical flow accelerator is less than 20 degrees.

15. The method of claim 14, further comprising a step of: controlling the length between said water outlet of said hollow conical flow accelerator and said receiving entrance of said particle condenser so that it is approximately 20 centimeters.

16. The method of claim 15, wherein said receiving entrance of said particle condenser has a diameter larger than that of said water outlet of said hollow conical flow accelerator and a tangential angle of less than 20 degrees.

17. The method of claim 16 further comprising a step of: adjusting said flow-control valve of said particle condenser and said flow adjuster of said plurality of clean water collecting pipes to keep the Reynolds Number of turbid water that passes through the particle-water separation area under 1000.

18. The method of claim 16, further comprising a step of: adjusting said flow-control valve of said particle condenser and said flow adjuster of said plurality of clean water collecting pipes to ensure that turbid water passes through the particle-water separation area within 60 seconds.

19. The method of claim 16, further comprising a step of: adjusting said flow-control valve of said particle condenser and said flow adjuster of said plurality of clean water collecting pipes to keep the flow velocity at the water outlet of said hollow conical flow accelerator at approximately 1 centimeter per second (cm/s.).

20. The method of claim 16, further comprising a step of: adjusting said flow-control valve of said particle condenser and said flow adjuster of said plurality of clean water collecting pipes to keep the colleted clean water from said plurality of clean water collecting pipes of said hollow cylinder at around 75% of said guided turbid water.

* * * * *